106-97.   AU 115     EX
12-2-75   XR    3,923,531

United States Patent [19]
Parsons et al.

[11]  3,923,531
[45]  *Dec. 2, 1975

[54] CARBON COMPOSITION AND SHAPED ARTICLE MADE THEREFROM

[75] Inventors: Joseph R. Parsons, Park Forest; Harold L. Rechter, Chicago, both of Ill.

[73] Assignee: Chicago Fire Brick Company, Chicago, Ill.

[ * ] Notice: The portion of the term of this patent subsequent to Nov. 5, 1991, has been disclaimed.

[22] Filed: July 5, 1974

[21] Appl. No.: 485,964

[52] U.S. Cl. .................. 106/56; 106/64; 106/97
[51] Int. Cl.$^2$. C04B 7/02; C04B 35/02; C04B 35/52
[58] Field of Search .................. 106/56, 64, 97

[56]     References Cited
         UNITED STATES PATENTS
3,252,813   5/1966   Cremer et al. .................. 106/64
3,442,670   5/1969   Parsons .................. 106/64
3,846,144   11/1974  Parsons et al. .................. 106/64

*Primary Examiner*—J. Poer
*Attorney, Agent, or Firm*—Foster York

[57]          ABSTRACT

Particles of carbon mixed with silicon and a bonding amount of calcium aluminate or Portland type cement. Other refractory materials and pitch may also be present. The composition is mixed with water and poured into a mold to form various shaped articles. These are set and dried sufficiently for shipment and use. The final carbon bonding takes place at high temperature use, above 2500°F, aided by carbonization of the pitch if pitch is also present.

6 Claims, No Drawings

CARBON COMPOSITION AND SHAPED ARTICLE MADE THEREFROM

BACKGROUND OF THE INVENTION

The invention relates to carbon compositions, suitable for making carbon blocks and other shapes for refractory use; and to the shaped article made therefrom.

The invention is an improvement over the compositions and refractory articles disclosed in our U.S. Pat. No. 3,422,670 in that the refractory article made by the composition of this invention provides greater strength at higher temperatures than the refractory article of U.S. Pat. No. 3,422,670.

The castable shapes with carbon or graphite made in accordance with our invention can be used in the most severe iron and steelmaking applications, such as a skimmer in a blast furnace trough or cupola spout, requiring only a dryout, and perform comparably to conventionally formed carbon and graphite refractories in the ability to withstand moving streams of molten iron and slags but with superior resistance to erosion and oxidation.

SUMMARY OF THE INVENTION

The castable formulations consist essentially of 20 to 80 per cent by weight of carbon or graphite, preferably three-fourths inch and finer although larger size carbon can be used; 5 to 25 per cent by weight silicon metal, preferably of high purity, in a mesh size suitably of −20 mesh or finer, preferably −200 mesh; 5 to 30 per cent by weight of a hydraulic cement, for example, calcium aluminate and calcium silicate cements, and from 0 to 65 per cent, preferably 20 to 50 per cent by weight, of other refractory additives, such as refractory oxides and silicates, which are beneficial to bond strength and/or oxidation resistance, including aluminum oxide, silica, zircon, pulverized firebrick and clays. Up to 20 per cent by weight of pitch may optionally be added to provide better bonding than obtained with the hydraulic cements at temperatures below the reaction temperature of carbon and silicon.

Refractory shaped articles such as tile and brick are prepared by blending the constituents with water, for example 12 to 20 per cent, suitably in a cement mixer; a small bowl type for small batches or a large paddle mixer for larger quantities. The mix is then cast into molds with, for example, a 9 × 2½ inch cavity 4½ inch deep. The shaped articles are air set, for example, overnight and oven dried at about 200°F for 2 or more days to dry out sufficiently for shipment and use.

Firing of the shapes takes place on use in furnaces at high temperatures. Typical firing carried out on tests of brick specimens was at 2550°F, a 5 hour hold, based on ASTM C 113-68, Schedule B. Bulk density, modulus of rupture, compressive strength and linear change was determined at room temperature. The final weight loss was used to determine carbon losses, correcting for normal firing weight losses with castables and calcining of clays. This exposure of five sides in an oxidizing kiln provides the most severe test conditions for our novel compositions.

DESCRIPTION OF PREFERRED EMBODIMENTS

The tables show carbon and graphite raw materials in quantities of 20 to 80 per cent by weight of the whole, but the carbon content indicated below the compositions is based on the known ash content of the individual carbonaceous constituents.

Formulations of carbon and graphite with silicon and calcium aluminate cements are shown in Table I. Without silicon, such formulations would lose all structural integrity on firing due to oxidation. With silicon, as shown in Table I, good strength properties are obtained, with decreasing carbon loss due to oxidation and generally increasing strength as silicon is increased. The use of cokes instead of graphite (No. 4), or inclusion of larger grain sizings (No. 5), appear to lower effectiveness, but a useful refractory is represented by all formulations of Table I.

Carbon contents above 80 per cent are not feasible because of the desirability of at least 10 per cent silicon in the high carbon range and at least 10 per cent calcium aluminate cement to provide adequate initial strength for the normal requirements of a castable. The preferred cement used is of the refractory calcium aluminate type having up to 35 per cent calcium oxide and at least 40 per cent aluminum oxide.

Silicon contents of 5 per cent and above are useful, but above 20 per cent is not necessary and add considerable expense to the formulation. With carbon contents above 50 per cent it is preferable to have at least 10 per cent silicon. We have found that −20 mesh silicon is effective, but −200 mesh is better for increased reactivity. The silicon should have no more than 3 per cent impurities, but if as much as 25 per cent impure it will retain some effectiveness.

Fine oxide addition increases strength with lower silicon contents, thereby decreasing cost, as shown in Table II. No. 1 in Table II has no silicon, and the carbon was essentially burned out although the high inorganic content held the samples together. Silica flour (Nos. 2, 3, 4), pulverized fire brick (No. 5), and milled zircon additions (Nos. 6, 7, 8) all resulted in high strengths with 5 to 12½ per cent silicon. These additions should all be of −30 mesh. Raw clays can be used but tend to make castables too plastic for ease of pouring.

Table III shows blends of high alumina with carbon, silicon, calcium aluminate and Portland (calcium silicate) cements. The alumina raw material in this case was calcined South American refractory grade bauxite, but any high alumina aggregate can be used. This combination is particularly effective for resistance to iron and steel slags. Calcined flint clays and other coarse refractory aggregates have also been used. In all cases, a refractory castable containing carbon or graphite is provided to make available the peculiar advantages of carbon to resist erosion and chemical reaction by molten metals and slags in a form that is oxidation resistant and of high strength.

The properties of high strength imparted by the silicon metal addition are realized when temperatures of 2500°F and above are obtained, and this is the case with exposure to molten iron and steel and their slags. The only preparation of the castable required prior to hot metal exposure is a dry-out, or a cure preferably at about 600°F if pitch is present (Nos. 5 and 7 in Table III).

TABLE I

HIGH CARBON FORMULATIONS WITH SILICON

| | Percent By Weight | | | | |
|---|---|---|---|---|---|
| | 1 | 2 | 3 | 4 | 5 |
| Natural Flake Graphite — ¾" & Finer | — | — | — | — | 40 |
| Natural Flake Graphite — ¼" & Finer | 60 | 45 | — | — | — |
| Natural Flake Graphite — 35 mesh | 20 | 25 | 65 | — | — |
| Calcined Coal — ¾" & Finer | — | — | — | 40 | — |
| Coke Breeze — ¼" & Finer | — | — | — | 20 | 20 |
| Carbon Fines — 60 mesh | — | — | — | 10 | 10 |
| Silicon, — 20 mesh | 10 | 20 | 20 | 10 | 10 |
| Calcium Aluminate Cement | 10 | 10 | 15 | 20 | 20 |
| Carbon Content | 56 | 49 | 46 | 59 | 59 |
| PROPERTIES — 2550°F FIRE: | 1 | 2 | 3 | 4 | 5 |
| Bulk Density — lbs./cu. ft. | 73 | 86 | 90 | 63 | 62 |
| Modulus of Rupture — psi | 200 | 450 | 670 | 125 | 90 |
| Compressive Strength — psi | — | 950 | 1700 | 350 | 400 |
| Shrinkage — % by weight | 1.0 | 0 | 1.0 | 2.0 | 2.2 |
| Carbon Loss — % by weight | 38 | 6 | 4 | 53 | 48 |

TABLE II

EFFECT OF FINE OXIDE ADDITION

| | Percent By Weight | | | | | | | |
|---|---|---|---|---|---|---|---|---|
| | 1 | 2 | 3 | 4 | 5 | 6 | 7 | 8 |
| Natural Flake Graphite — ¼" & Finer | 50 | 45 | 55 | 45 | 55 | 40 | 30 | 45 |
| Carbon or Graphite Fines — 35 mesh | 12.5 | 15 | — | 12.5 | — | 10 | 10 | 12.5 |
| Silicon — 20 mesh | 0 | 5 | 10 | 12.5 | 10 | 10 | 10 | 12.5 |
| Calcium Aluminate Cement | 12.5 | 10 | 15 | 10 | 15 | 10 | 10 | 10 |
| Pulverized Brick | — | — | — | — | 20 | — | — | — |
| Silica Flour | 25 | 25 | 20 | 20 | — | — | — | — |
| Milled Zircon | — | — | — | — | — | 30 | 40 | 20 |
| Carbon Content | 45 | 42 | 39 | 40 | 39 | 35 | 28 | 40 |
| PROPERTIES — 2550°F FIRE: | 1 | 2 | 3 | 4 | 5 | 6 | 7 | 8 |
| Bulk Density — lbs./cu. ft. | 68 | 87 | 93 | 92 | 97 | 109 | 119 | 99 |
| Modulus of Rupture — psi | 100 | 190 | 300 | 900 | 590 | 770 | 950 | 700 |
| Compressive Strength — psi | 300 | 1600 | 1300 | 2100 | 2100 | 4500 | 4800 | 1200 |
| Shrinkage — % by weight | 1.4 | 1.1 | 0.2 | 0.8 | 0.5 | 1.6 | 1.0 | 0.3 |
| Carbon Loss — % by weight | 80 | 32 | 23 | 11 | 4 | 11 | 4 | 14 |

TABLE III

BLENDS OF HIGH ALUMINA & CARBON WITH SILICON

| | Percent By Weight | | | | | | |
|---|---|---|---|---|---|---|---|
| | 1 | 2 | 3 | 4 | 5 | 6 | 7 |
| Natural Flake Graphite — ¼" & Finer | 35 | — | 15 | 25 | 19 | — | 20 |
| Calcined Coal — ¾" & Finer | — | — | — | — | — | 25 | — |
| Coke Breeze — ¼" & Finer | — | — | — | — | 19 | 20 | 20 |
| Graphite or Carbon Fines — 35 mesh | — | 20 | 10 | 10 | — | — | — |
| Pellet Pitch | — | — | — | — | 5 | — | 5 |
| Silicon — 20 mesh | 0 | 5 | 5 | 10 | 9 | 10 | 10 |
| Calcium Aluminate Cement | 15 | 10 | 10 | 15 | 19 | 20 | — |
| Calcined Refractory Bauxite — ¼" & Finer | 40 | 50 | 45 | 30 | 28 | 25 | 25 |
| Calcined Refractory Bauxite — 30 mesh | — | 10 | 10 | — | — | — | — |
| Ball Clay | 10 | 5 | 5 | 10 | — | — | — |
| Portland Cement | — | — | — | — | — | — | 20 |
| Carbon Content | 25 | 16 | 19 | 25 | 35 | 38 | 37 |
| PROPERTIES — 2550°F FIRE: | 1 | 2 | 3 | 4 | 5 | 6 | 7 |
| Bulk Density — lbs./cu. ft. | 99 | 115 | 114 | 112 | 90 | 85 | 85 |
| Modulus of Rupture — psi | 160 | 610 | 400 | 400 | 220 | 153 | 170 |
| Compressive Strength — psi | 150 | 1220 | 1280 | 2000 | 750 | 520 | 900 |
| Shrinkage — % by weight | 0.9 | 0.7 | 0 | 0.6 | 0.2 | 0.4 | 0.6 |
| Carbon Loss — % by weight | 76 | 32 | 21 | 8 | 26 | 38 | 30 |

We claim:

1. A composition suitable for making shaped refractory articles consisting essentially of particles of carbon in from 20–80 per cent by weight, a hydraulic cement in from 5–30 per cent by weight, particles of a refractory oxide or silicate in 0–65 per cent by weight, silicon metal in at least 5 per cent by weight, and pitch from 0–20 per cent by weight.

2. The composition of claim 1 in which silicon is present in 5–25 per cent by weight.

3. The composition of claim 1 in which silicon is present in at least 10 per cent by weight and calcium aluminate cement is present in at least 10 per cent by weight.

4. The composition of claim 1 in which aluminum oxide, silica, zircon, pulverized firebrick, clay, or mixtures thereof are present in 20–50 percent by weight.

5. The composition of claim 1 in which pitch is present and the aluminum oxide is present as refractory calcined bauxite.

6. A refractory shaped article consisting essentially of a carbon concrete consisting essentially of from 20–80 per cent by weight of carbon particles and from 5–25 per cent by weight of particles of silicon bonded together by a calcium aluminate or calcium silicate cement.

* * * * *